(12) United States Patent
Watkins et al.

(10) Patent No.: US 7,597,946 B2
(45) Date of Patent: Oct. 6, 2009

(54) GEL REDUCTION IN BLENDS OF THERMOPLASTIC POLYURETHANE AND HYDROXYL FUNCTIONAL POLYMERS

(75) Inventors: Richard L Watkins, Portland, OR (US); Yihua Chang, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 98 days.

(21) Appl. No.: 10/652,746

(22) Filed: Aug. 29, 2003

(65) Prior Publication Data

US 2005/0048236 A1 Mar. 3, 2005

(51) Int. Cl.
*B29D 22/00* (2006.01)
*B29D 23/00* (2006.01)
*B32B 1/08* (2006.01)

(52) U.S. Cl. ............... 428/35.7; 428/35.4; 428/36.6; 428/69; 428/423.1; 36/28; 36/30 R

(58) Field of Classification Search ............ 428/35.7, 428/36.4, 35.4, 36.6, 36.7, 69, 423.1, 521; 36/15 R, 28, 30 R
See application file for complete search history.

(56) References Cited

U.S. PATENT DOCUMENTS

| | | | | |
|---|---|---|---|---|
| 3,718,622 A | * | 2/1973 | Camilleri et al. | ............ 528/49 |
| 4,156,768 A | * | 5/1979 | Cook | ............ 525/453 |
| 4,999,213 A | * | 3/1991 | Meyer | ............ 427/485 |
| 5,028,648 A | | 7/1991 | Famili et al. | |
| 5,034,281 A | | 7/1991 | Kawasaki et al. | |
| 5,118,743 A | | 6/1992 | Yonezu et al. | |
| 5,194,474 A | | 3/1993 | Aoyama et al. | |
| 5,713,141 A | | 2/1998 | Mitchell et al. | |
| 5,895,797 A | | 4/1999 | Hayashihara et al. | |
| 6,082,025 A | | 7/2000 | Bonk et al. | |
| 6,096,393 A | | 8/2000 | Ikeda et al. | |
| 6,127,026 A | * | 10/2000 | Bonk et al. | ............ 428/213 |
| 6,187,837 B1 | | 2/2001 | Pearce | |
| 6,203,868 B1 | * | 3/2001 | Bonk et al. | ............ 428/35.4 |
| 6,398,535 B1 | | 6/2002 | Cloeren | |

FOREIGN PATENT DOCUMENTS

| | | |
|---|---|---|
| EP | 0 466 057 | 5/1991 |
| EP | 0 466 057 A1 | 7/1991 |
| JP | 037175032 | 7/1991 |
| JP | 03255288 | 11/1991 |
| WO | WO 93/00399 | 1/1993 |

OTHER PUBLICATIONS

Chinese Notification of the First Office Action issued Apr. 11, 2008.

* cited by examiner

*Primary Examiner*—Michael C Miggins
(74) *Attorney, Agent, or Firm*—Harness, Dickey & Pierce, P.L.C.

(57) ABSTRACT

Gas barrier layers and composites contain a low gel sheet produced from a composition containing a thermoplastic polyurethane (TPU), a hydroxyl functional copolymer, and a gel reducing additive. The gel reducing additive has functional groups that can react with isocyanate groups to reduce gel formation during the processing of blends of urethane containing polymers and hydroxyl functional polymers. Multilayer composites containing the low gel sheets can be made into inflatable membranes for containing an inflationary gas. In a particularly preferred embodiment, the membranes are used as bladders of cushioning devices in the soles of shoes, particularly athletic shoes.

22 Claims, 3 Drawing Sheets

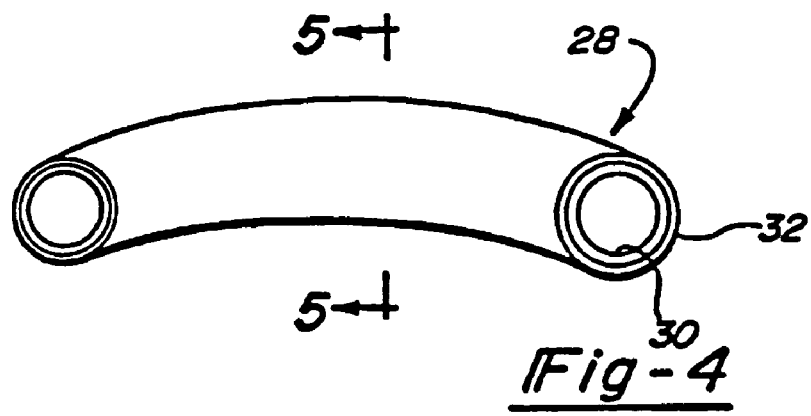
Fig-4
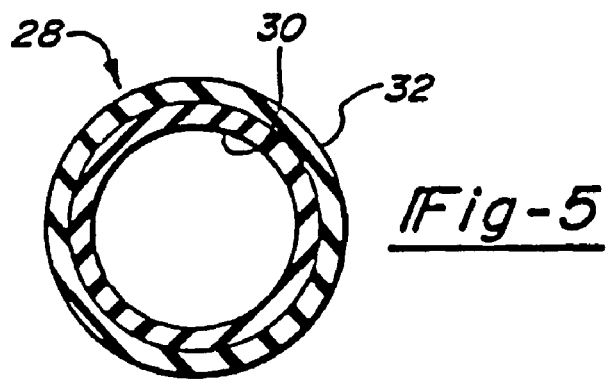
Fig-5
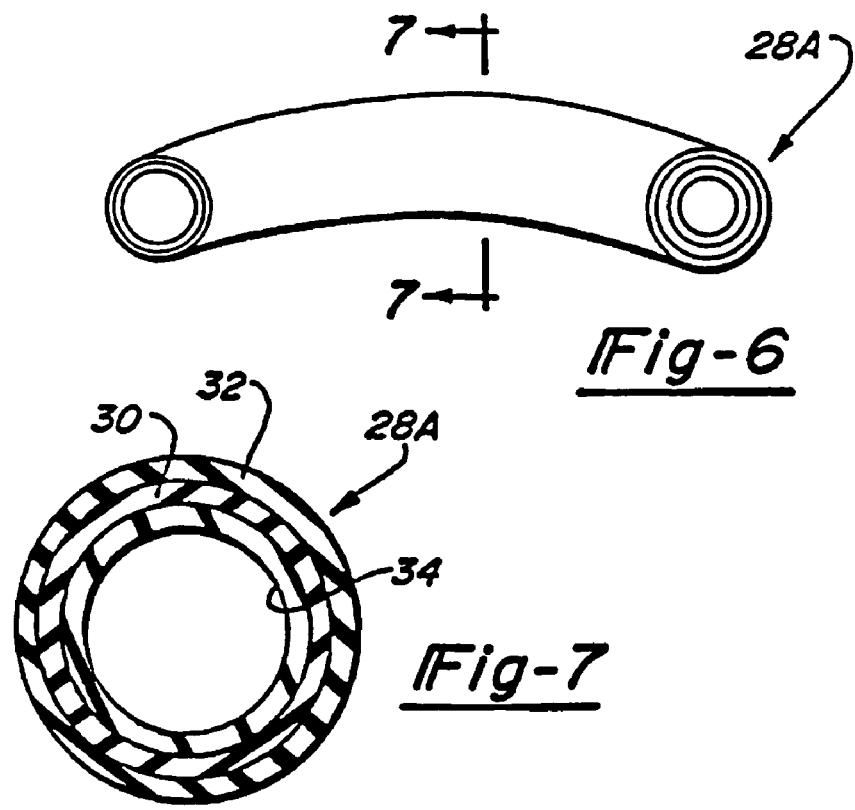
Fig-6
Fig-7

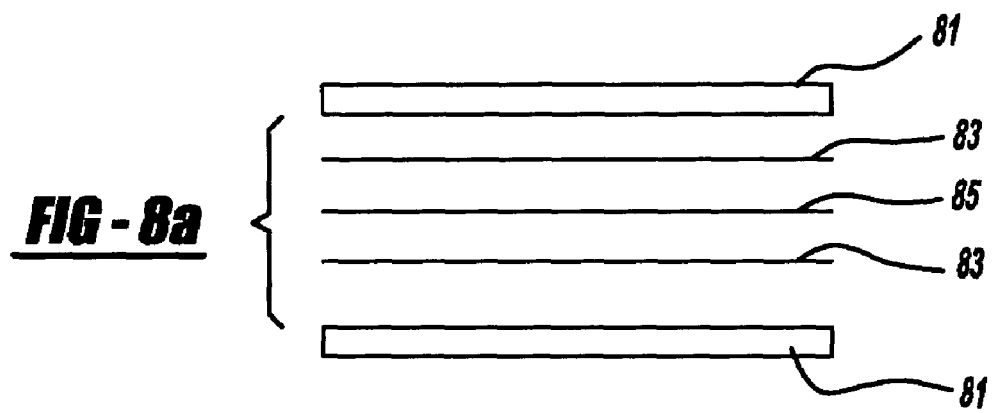
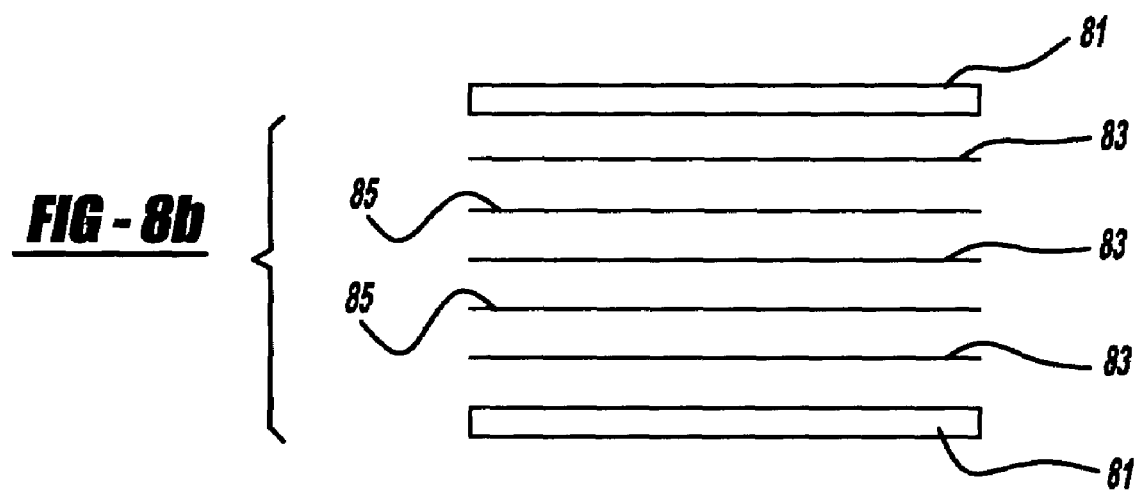
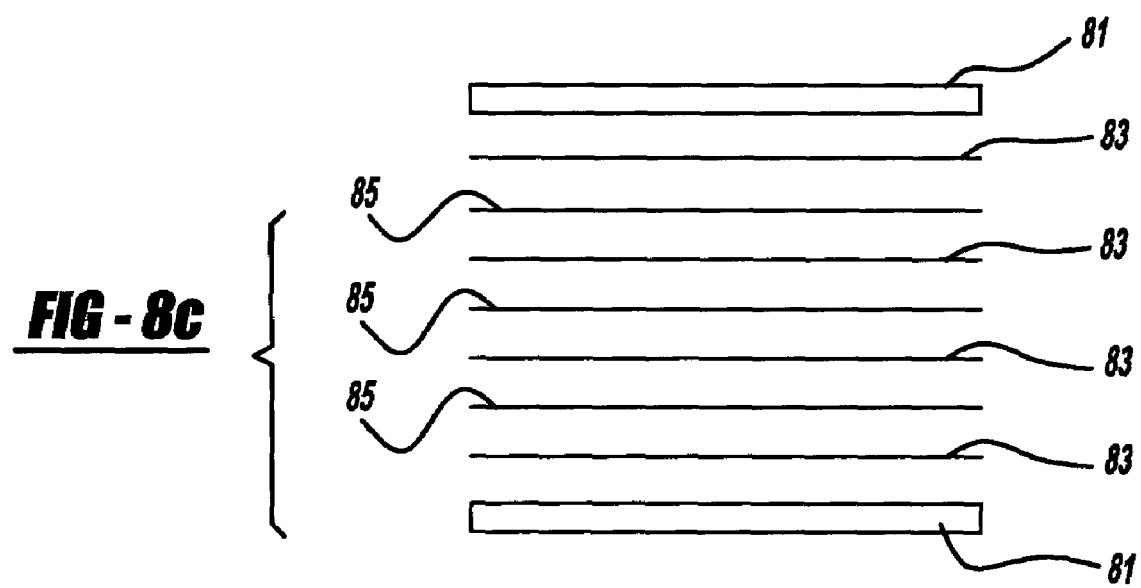

GEL REDUCTION IN BLENDS OF THERMOPLASTIC POLYURETHANE AND HYDROXYL FUNCTIONAL POLYMERS

FIELD OF THE INVENTION

The present invention relates to composite materials used as gas barrier layers. More particularly, the invention relates blends of thermoplastic polyurethane and hydroxyl functional gas barrier copolymers, and to methods of reducing gel during their preparation.

BACKGROUND OF THE INVENTION

Polymer films made of certain hydroxyl functional copolymers are well known for their gas barrier properties. For example, a copolymer of ethylene and vinyl alcohol may be extruded into a film that is resistant to the flow of gases such as oxygen. Such films find use in, for example, the food packaging industry to prevent spoilage of perishable produce.

The gas barrier material may also be used to form a pressurized bladder or cushioning device for applications such as in footwear. In this application, the gas barrier layer may be alternated in the membrane with a second layer made of an elastomeric material. Bonk et al. in U.S. Pat. No. 6,127,026 describe such a membrane comprising a microlayer polymeric composite having at least about 10 microlayers. The microlayers alternate between at least one gas barrier material and at least one elastomeric material, exemplified by thermoplastic polyurethane (TPU).

To conserve natural resources, it is desirable to recycle and reuse composites containing such barrier layers and elastomeric materials. For example, to recycle the composite of Bonk et al. U.S. Pat. No. 6,127,026, it is possible to grind the composite to obtain a mixture containing both the gas barrier layer material and the thermoplastic polyurethane.

In addition, it is known to use blends of TPU and copolymers of ethylene and vinyl alcohol (EVOH) to produce coextruded sheets for a variety of uses related to gas barriers. For example, Bonk et al in U.S. Pat. No. 6,203,868 describe membranes including a barrier layer made of a blend of one or more thermoplastic polyurethanes and one or more copolymers of ethylene and vinyl alcohol.

Making blends of TPU and EVOH may involve regrinding composites such as described above or coextruding blends of thermoplastic polyurethane and barrier polymer at elevated temperature. When such components are ground and coextruded, a gel is observed to form in the mixture that deleteriously affects flow properties, handleability, and appearance of the extruded layer. In particular, the formation of gel leads to a hazy appearance in the coextruded layer. For cosmetic purposes, and to improve the handleability of coextruded blends of thermoplastic polyurethane and hydroxyl functional polymers such as ethylene vinyl alcohol copolymer, it would be desirable to reduce the gel content of the coextruded sheets prepared from the blend of TPU and hydroxyl functional polymer.

SUMMARY OF THE INVENTION

Improved gas barrier layers and composites are produced according to the invention by forming a low gel sheet from a composition containing three components. A first component comprises a thermoplastic polyurethane (TPU). A second component comprises a hydroxyl functional copolymer, and the third component is a gel reducing additive. In another aspect, a polymer composition with decreased gel forming tendency when blended with polymers containing urethane linkages is provided. The composition contains a hydroxyl functional polymer as described above and the gel reducing additive. Upon adding a urethane polymer such as a thermoplastic polyurethane to the polymer composition, a composition is obtained that can be formed or extruded into a sheet having desirable properties.

In another embodiment, sheets made from the compositions are provided. The sheets are produced by combining the first, second, and third components to form a blend, applying thermal energy, mechanical energy or both to the blend, and producing a sheet from the blend.

In another embodiment, a multilayer composite is provided made up of a plurality of flexible layers. At least one of the flexible layers is the product of forming a sheet from a blend of thermoplastic polyurethane, hydroxyl functional copolymer, and gel reducing additives as described above. In a preferred embodiment, the multilayer composite contains alternating layers of thermoplastic polyurethane and hydroxyl functional polymer, for example ethylene vinyl alcohol copolymer (EVOH). In addition, at least one of the flexible layers is produced from a blend of thermoplastic polyurethane and hydroxyl functional copolymer, formed for example by coextrusion in the presence of the gel reducing additive.

In a preferred embodiment, the multilayer composite can be made into an inflatable membrane for containing an inflationary gas. The membrane is made of a multilayer composite, wherein the composite contains at least one flexible layer made of a blend of thermoplastic polyurethane, hydroxyl functional copolymer, and a gel reducing additive as described above. In a particularly preferred embodiment, the membranes are used as bladders of cushioning devices in the soles of shoes, particularly athletic shoes.

BRIEF DESCRIPTION OF THE DRAWINGS

The present invention will become more fully understood from the detailed description and the accompanying drawings, wherein:

FIG. 4 is a fragmentary side perspective view of one embodiment of a tubular-shaped, two-layer cushioning device in accordance with the present invention;

FIG. 5 is a sectional view taken along line 4-4 of FIG. 4;

FIG. 6 is a fragmentary side perspective view of a second embodiment of a tubular-shaped, three-layer cushioning device in accordance with the present invention; and FIG. 7 is a sectional side view taken along line 6-6 of FIG. 6;

FIG. 8 is a schematic illustration of multilayer composites of the invention.

DETAILED DESCRIPTION OF THE PREFERRED EMBODIMENTS

Figure 1:
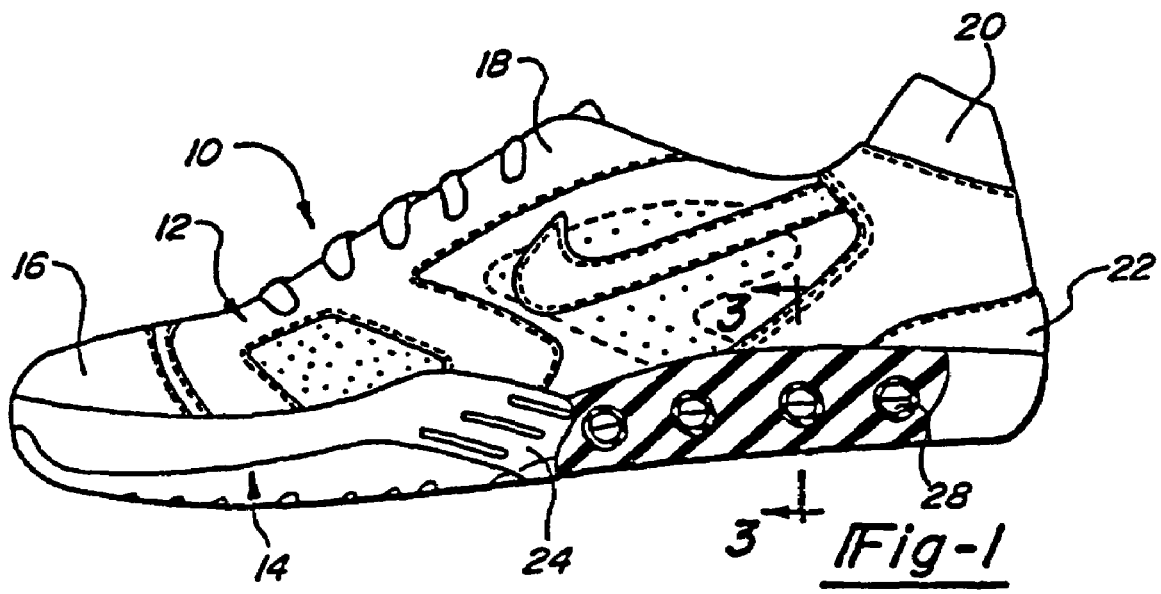
FIG. 1 is a side elevational view of an athletic shoe in accordance with the present invention with a portion of the mid-sole cut-a-way to expose a cross-sectional view.

A polymer composition, which has a decreased gel forming tendency when blended with polymers containing urethane linkages, contains a hydroxyl functional barrier copolymer and a gel reducing additive. The polymer composition may be added to a urethane-containing polymer such as thermoplastic polyurethane to provide low gel compositions of the invention. The low gel compositions may be extruded or otherwise formed into sheets. The sheets may be used to provide multilayer composites, gas barrier membranes, and other devices of the invention.

The gel reducing additive of the compositions preferably has molecular weight less than the molecular weight of the hydroxyl functional copolymer, further defined below. The gel reducing additive further comprises one or more functional groups capable of reacting with the urethane linkages of the thermoplastic polyurethane of the composition. In a preferred embodiment, the gel reducing additive is selected from the group consisting of compounds with at least one hydroxyl group, compounds with at least one primary amino group, compounds with at least one secondary amino group, compounds with at least one carboxyl group, and compounds with at least one carboxylic anhydride group. It is believed that the gel reducing additive functions to reduce gel in the blends of thermoplastic polyurethane and hydroxyl functional polymer by competing with the hydroxyl functional polymer for reaction with the urethane linkages of the thermoplastic polyurethane. In one embodiment, it is preferred to use a gel reducing additive having at least one primary hydroxyl group.

It is believed that the gel is formed through a series of chemical reactions between TPU and the hydroxyl functional copolymer. The first step is dissociation of urethane linkage in TPU to form an isocyanate and a hydroxyl group. The newly generated isocyanate group subsequently reacts with a hydroxyl group of EVOH or other hydroxyl functional copolymers to form a new urethane linkage. Since an EVOH chain contains multiple hydroxyl groups, several polyurethane molecules can be attached to the same EVOH chain and two or more EVOH chains can join together through polyurethane segments to form a network or gel. The gel reducing additive is believed to reduce gel by reacting preferentially with regenerated isocyanate groups formed during the dissociation process. To ensure that the regenerated isocyanate groups are consumed preferentially by the gel reducing additive, the gel reducing additive should preferably contain functional groups more reactive to isocyanate than the hydroxyl groups of the hydroxyl functional copolymers. When the hydroxyl functional copolymer contains secondary hydroxyl groups (such as is the case with EVOH), the gel reducing agent may contain primary alcohols or amine groups that tend to react faster with isocyanate than do secondary hydroxyls. When the hydroxyl functional copolymer contains primary hydroxyl groups or a mixture of secondary and primary hydroxyl groups, it is to be expected that a slightly higher concentration of gel reducing additive may be needed to effectively "compete" with the relatively more reactive primary hydroxyls of the copolymer. In a preferred embodiment, the gel reducing additive has a lower molecular weight than the copolymer, so that any reaction product with the TPU will tend not to lead to gel formation. The gel reducing additive may also have carboxyl or anhydride functional groups. In a preferred embodiment, the gel reducing additive should also have solubility and mobility in the thermoplastic polyurethane to increase the rate of reaction. In one aspect, low molecular weight additives are preferred for their high solubility and rapid diffusion in the thermoplastic, as well as the high hydroxyl to mass ratio.

In a preferred embodiment, the gel reducing additive comprises a polyester polyol, preferably a polyester diol. The polyester polyols are in general prepared by the condensation polymerization of polyacid compounds and polyol compounds. Preferably, the polyacid compounds and polyol compounds are di-functional. Diacid compounds and diols may be used to prepare substantially linear polyester diols, although minor amounts of tri-functional and higher functionality materials (for example up to about 5 mole percent) can be included. Suitable acid compounds include, without limitation, glutaric acid, succinic acid, malonic acid, oxalic acid, phthalic acid, isophthalic acid, terephthalic acid, cyclohexanedicarboxylic acid, hexahydrophthalic acid, adipic acid, and maleic acid, as well as esters of these. Mixtures of diacid components may also be used. Suitable polyols include, without limitation, ethylene glycol, diethylene glycol, triethylene glycol, tetra-ethylene glycol, propylene glycol, dipropylene glycol, tripropylene glycol, tetrapropylene glycol, cyclohexanedimethanol, 2-ethyl-1,6-hexanediol, Esterdiol 204 (sold by Eastman Chemical Co.), 1,4-butanediol, 1,5-pentanediol, 1,3-propanediol, butylene glycol, and neopentyl glycol. Combinations of polyols may also be used. Small amounts of triols or higher functionality polyols, such as trimethylolpropane or pentaerythritol, are sometimes included. In a preferred embodiment, the carboxylic acid includes adipic acid and the diol includes 1,4-butanediol. Typical catalysts for the esterification polymerization are protonic acids, Lewis acids, titanium alkoxides, and dialkyltin oxides.

In another embodiment, the gel reducing additive comprises a polyether polyol, preferably a polyether diol. Polyether polyols and diols may be synthesized by reacting a hydroxyl functional initiator with a cyclic ether compound to produce the polyether polyol or diol. The cyclic ether is preferably selected from the group consisting of ethylene oxide, propylene oxide, butylene oxide, tetrahydrofuran, and combinations of these. The polymerization may be carried out, for example, by charging the hydroxyl functional initiator and a catalytic amount of caustic, such as potassium hydroxide, sodium methoxide, or potassium tert-butoxide, and adding the alkylene oxide at a sufficient rate to keep the monomer available for reaction. Two or more alkylene oxide monomers may be randomly copolymerized by coincidental addition or polymerized in blocks by sequential addition. Alkylene oxide polymer segments produced by such copolymerization include without limitation, the polymerization products of ethylene oxide, propylene oxide, cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations.

In a preferred embodiment, the polyester polyol and the polyether polyol used as gel reducing additives have a number average molecular of weight from about 300 to about 4000, more preferably from about 400 to 3000, and more preferably from about 500 to about 2000. In another embodiment, a polyester polyol or polyether polyol is used having a number average molecular weight of about 2000 or less, preferably about 1000 or less.

In addition to the polymeric polyester polyol and polyether polyol described above, the gel reducing additive may also be monomeric. In a preferred embodiment, the molecular weight of the gel reducing additive is less than or equal about 400, and preferably less than or equal to about 200. It is preferred to use a gel reducing additive having two or more hydroxyl groups, or having two or more amino groups. Non-limiting example of gel reducing additives include hydroxyl-functional additives such as ethylene glycol, diethylene glycol, cyclohexanedimethanol, glycerol, trimethylolpropane, ditrimethylolpropane, pentaerythritol, polyethylene glycol of molecular weight less than or equal to 400, propylene glycol, and dipropylene glycol, and amine functional additives such ethylenediamine, diethylenetriamine, triethylenetetramine, aniline, benzylamine, anisidine, toluidine, aminophenol, aminoacetanilide, and 1-(2-aminoethyl)piperazine.

The hydroxyl functional copolymer components of the compositions of the invention are preferably selected from copolymers known to have gas barrier properties. In general, they comprise a polymer having 10 mole percent or more of repeating units of structure

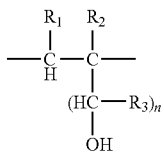

wherein n is 0 or 1, $R_1$ and $R_2$ are independently hydrogen, methyl, or ethyl, and $R_3$ is hydrogen or $C_{1-3}$ alkyl. Preferably, the hydroxyl functional copolymer contains 30 mole percent or more repeating units of the above structure. In other preferred embodiments, the hydroxyl functional copolymer contains at least 45 mole percent, at least 55 mole percent, and at least 65 mole percent repeating units of the above structure.

The polymer may contain more than one kind of repeating unit of the above-mentioned structure having the same or different $R_1$, $R_2$, $R_3$, and n. Where the polymer contains more than one kind of repeating unit, the mole percent content of the structural units is given as its total amount.

In addition to the repeating units of the above-mentioned structure, the polymer may contain co-monomers in an amount such that acceptable performance of the gas barrier material is maintained. Examples of the co-monomer include olefin monomers such as ethylene, propylene, 1-butene, isobutene, 1-pentene, 1-hexene, and 1-octene; diene monomers such as butadiene and isoprene; aromatic substituted vinyl monomers such as styrene and a-methylstyrene; acrylate monomers such as methyl acrylate, ethyl acrylate, butyl acrylate and methyl methacrylate; vinyl ether monomers such as methyl vinyl ether, ethyl vinyl ether, and butyl vinyl ether; vinyl halide monomers such as vinyl chloride and vinyl fluoride; vinylidene halide monomers such as vinylidene chloride and vinylidene fluoride; acrylonitrile monomers such as acrylonitrile and methacrylonitrile; and maleic acid derivatives such as maleimide, N-methylmaleimide, and dimethylmaleimide.

In the case where the polymer contains comonomers, the monomers may be arranged in random, alternating, or block fashion.

The repeating units of the above structure may be incorporated into the polymers and copolymers by a number of known methods. In a first example, an acrylate or methacrylate monomer may be polymerized, followed by reduction to the hydroxyl containing compound. In a second method, the hydroxyl containing repeating units may be incorporated by polymerization of unsaturated alcohols such as allyl alcohol or methallyl alcohol. In a third method, the hydroxyl containing repeating unit may be incorporated by polymerizing an allyl halide derivative, followed by conversion of the halogen into a hydroxyl group. Such methods of synthesis are known in the art, and are described for example in Ikeda et al. U.S. Pat. No. 6,096,393 and references cited therein. The copolymers may also be prepared by polymerizing vinyl ester monomers, such as vinyl acetate followed by a saponification step to remove the ester group and provide a vinyl hydroxide functional group.

A preferred hydroxyl functional copolymer is a copolymer of ethylene and vinyl alcohol (EVOH). Such polymers may be conveniently obtained by preparing a saponification product of an ethylene vinyl acetate copolymer. In a preferred embodiment, the content of ethylene is 20 mole percent or greater, preferably from 20-60 mole percent, and more preferably from 20-55 mole percent. In another embodiment, the content of ethylene units of EVOH is preferably 10-99 mole percent, more preferably 20-75 mole percent, and more preferably 25-60 mole percent, particularly 25-50 mole percent. The saponification degree of the vinyl ester units is preferably at least 50 mole percent, more preferably at least 90 mole percent. In a preferred embodiment, the saponification degree is at least 95 mole percent and more preferably at least 98 mole percent.

Commercially available EVOH include SOARNOL™, from Nippon Gohsei Co., Ltd. (U.S.A.) of New York, N.Y., and EVAL®, from Eval Company of Houston, Tex. For example, EVAL® LCF101A has an average ethylene content of between about 25 mol % and about 48 mol %. In general, lower ethylene contents result in stronger bonding between the respective layers of thermoplastic urethane and ethylene-vinyl alcohol copolymers.

As the thermoplastic polyurethane of the invention, particularly suitable are thermoplastic polyester-polyurethanes, polyether-polyurethanes, and polycarbonate-polyurethanes, including, without limitation, polyurethanes polymerized using as diol reactants polytetrahydrofurans, polyesters, polycaprolactone polyesters, and polyethers of ethylene oxide, propylene oxide, and copolymers including ethylene oxide and propylene oxide. These polymeric diol-based polyurethanes are prepared by reaction of the polymeric diol (polyester diol, polyether diol, polycaprolactone diol, polytetrahydrofuran diol, or polycarbonate diol), one or more polyisocyanates, and, optionally, one or more chain extension compounds. Chain extension compounds, as the term is used herein, are compounds having two or more functional groups reactive with isocyanate groups. Preferably the polymeric diol-based polyurethane is substantially linear (i.e., substantially all of the reactants are di-functional).

The polyester diols used in forming the preferred thermoplastic polyurethane of the invention are in general prepared by the condensation polymerization of polyacid compounds and polyol compounds. Preferably, the polyacid compounds and polyol compounds are di-functional, i.e., diacid compounds and diols are used to prepare substantially linear polyester diols, although minor amounts of mono-functional, tri-functional, and higher functionality materials (perhaps up to 5 mole percent) can be included. Suitable dicarboxylic acids include, without limitation, glutaric acid, succinic acid, malonic acid, oxalic acid, phthalic acid, hexahydrophthalic acid, adipic acid, maleic acid and mixtures of these. Suitable polyols include, without limitation, wherein the extender is selected from the group consisting of ethylene glycol, diethylene glycol, triethylene glycol, tetraethylene glycol, propylene glycol, dipropylene glycol, tripropylene glycol, tetrapropylene glycol, cyclohexanedimethanol, 2-ethyl-1,6-hexanediol, Esterdiol 204 (sold by Eastman Chemical Co.), 1,4-butanediol, 1,5-pentanediol, 1,3-propanediol, butylene glycol, neopentyl glycol, and combinations thereof. Small amounts of triols or higher functionality polyols, such as trimethylolpropane or pentaerythritol, are sometimes included. In a preferred embodiment, the carboxylic acid includes adipic acid and the diol includes 1,4-butanediol. Typical catalysts for the esterification polymerization are protonic acids, Lewis acids, titanium alkoxides, and dialkyltin oxides.

The polymeric polyether or polycaprolactone diol reactant used in preparing the preferred thermoplastic polyurethanes is prepared by reacting a diol initiator, e.g., ethylene or propylene glycol, with a lactone or alkylene oxide chain-extension reagent. Preferred chain-extension reagents are epsilon caprolactone, ethylene oxide, and propylene oxide. Lactones that can be ring opened by an active hydrogen are well-known in the art. Examples of suitable lactones include, without limitation, ε-caprolactone, γ-caprolactone, β-butyrolactone, β-propiolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one preferred embodiment, the lactone is ε-caprolactone. Lactones useful in the practice of the invention can also be characterized by the formula:

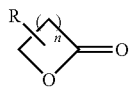

wherein n is a positive integer of 1 to 7 and R is one or more H atoms, or substituted or unsubstituted alkyl groups of 1-7 carbon atoms. Useful catalysts include those mentioned above for polyester synthesis. Alternatively, the reaction can be initiated by forming a sodium salt of the hydroxyl group on the molecules that will react with the lactone ring.

In another embodiment of the invention, a diol initiator is reacted with an oxirane-containing compound to produce a polyether diol to be used in the polyurethane polymerization. The oxirane-containing compound is preferably an alkylene oxide or cyclic ether, especially preferably a compound selected from ethylene oxide, propylene oxide, butylene oxide, tetrahydrofuran, and combinations of these. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The alkylene oxide polymerization is typically base-catalyzed. The polymerization may be carried out, for example, by charging the hydroxyl-functional initiator and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition and polymerized in blocks by sequential addition. Homopolymers or copolymers of ethylene oxide or propylene oxide are preferred.

Tetrahydrofuran polymerizes under known conditions to form repeating units of —[CH$_2$CH$_2$CH$_2$CH$_2$O]—. Tetrahydrofuran is polymerized by a cationic ring opening reaction using such counterions as SbF$_6^-$, AsF$_6^-$PF$_6^-$, SbCl$_6^-$, BF$_4^-$, CF$_3$SO$_3^-$, FSO$_3^-$, and ClO$_4^-$. Initiation is by formation of a tertiary oxonium ion. The polytetrahydrofuran segment can be prepared as a "living polymer" and terminated by reaction with the hydroxyl group of a diol such as any of those mentioned above.

Aliphatic polycarbonate diols are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

The polymeric diol, such as the polymeric polyester diols described above, which are used in the polyurethane synthesis preferably have a number average molecular weight (determined for example by the ASTM D-4274 method) of from about 300 to about 4,000; more preferably from about 400 to about 3,000; and still more preferably from about 500 to about 2,000. The polymeric diol generally forms a "soft segment" of the elastomeric polyurethane.

The synthesis of the elastomeric polyurethane may be carried out by reacting one or more of the above polymeric diols, one or more compounds having at least two isocyanate groups, and, optionally, one or more chain extension agents. The elastomeric polyurethanes are preferably linear and thus the polyisocyanate component preferably is substantially difunctional. Useful diisocyanate compounds used to prepare the thermoplastic polyurethanes of the invention include, without limitation, isophorone diisocyanate (IPDI), methylene bis-4-cyclohexyl isocyanate (H$_{12}$MDI), cyclohexane diisocyanate (CHDI), m-tetramethyl xylene diisocyanate (m-TMXDI), p-tetramethyl xylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis(cyclohexyl isocyanate), the various isomers of toluene diisocyanate, meta-xylylenediisocyanate and para-xylylenediisocyanate, 4-chloro-1,3-phenylene diisocyanate, 1,5-tetrahydronaphthalene diisocyanate, 4,4'-dibenzyl diisocyanate, 1,2,4-benzene triisocyanate, xylylene diisocyanate (XDI), and combinations thereof. Particularly useful is diphenylmethane diisocyanate (MDI).

Useful active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders preferably range from about 60 to about 400. Alcohols and amines are preferred. Typical examples of useful diols that are used as polyurethane chain extenders include, without limitation, 1,6-hexanediol, cyclohexanedimethanol (sold as CHDM by Eastman Chemical Co.), 2-ethyl-1,6-hexanediol, Esterdiol 204 (sold by Eastman Chemical Co.), 1,4-butanediol, ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; 1,3-propanediol, 1,4-butanediol, neopentyl glycol, dihydroxyalkylated aromatic compounds such as the bis (2-hydroxyethyl) ethers of hydroquinone and resorcinol; p-xylene-α, α'-diol; the bis (2-hydroxyethyl) ether of p-xylene-α, α'-diol; m-xylene-α, α'-diol, their bis(2-hydroxyethyl) ethers and mixtures thereof. Suitable diamine extenders include, without limitation, p-phenylenediamine, m-phenylenediamine, benzidine, 4,4'-methylenedianiline, 4,4'-methylenebis(2-chloroaniline), ethylene diamine, and combinations of these. Other typical chain extenders are amino alcohols such as ethanolamine, propanolamine, butanolamine, and combinations of these. Preferred extenders include ethylene glycol, diethylene glycol, triethylene glycol, tetraethylene glycol, propylene glycol, dipropylene glycol, tripropylene glycol, tetrapropylene glycol, 1,3-propylene glycol, 1,4-butanediol, 1,6-hexanediol, and combinations of these.

In addition to the above-described difunctional extenders, a small amount of trifunctional extenders such as trimethylolpropane, 1,2,6-hexanetriol and glycerol, and/or monofunctional active hydrogen compounds such as butanol or dimethyl amine, may also be present. The amount of trifunctional extenders and/or monofunctional compounds employed would preferably be 5.0 equivalent percent or less based on the total weight of the reaction product and active hydrogen containing groups employed.

The reaction of the polyisocyanate, polymeric diol, and chain extension agent is typically conducted by heating the components, for example by melt reaction in a twin screw extruder. Typical catalysts for this reaction include organotin catalysts such as stannous octoate. Generally, the ratio of polymeric diol, such as polyester diol, to extender can be varied within a relatively wide range depending largely on the desired hardness of the final polyurethane elastomer. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 0.95:1 to 1.10:1, and more preferably, 0.98:1 to 1.04:1. The polymeric diol segments typically are from about 35% to about 65% by weight of the polyurethane polymer, and preferably from about 35% to about 50% by weight of the polyurethane polymer.

It may be desirable under certain applications to include blends of polyurethanes to form the structural layers of the polymeric composites of the invention, such as when susceptibility to hydrolysis is of particular concern. For example, a polyurethane including soft segments of polyether diols or polyester diols formed from the reaction mixture of a carboxylic acid and a diol wherein the repeating units of the reaction product has more than eight carbon atoms can be blended with polyurethanes including polyester diols having repeating units of eight or less carbon atoms or products of branched diols. Preferably, the polyurethanes other than those including polyester diol repeating units having eight or less carbon atoms or with oxygen atoms connected to tertiary carbons will be present in the blends in an amount up to about 30 wt. %, (e.g. 70 wt. % polyethylene glycol adipate based polyurethane, 30% isophthalate polyester diol based polyurethane). Specific examples of the polyester diols wherein the reaction product has more than eight carbon atoms include poly(ethylene glycol isophthalate), poly(1,4-butanediol isophthalate) and poly(1,6-hexanediol isophthalate).

As an alternative to blends of various thermoplastic polyurethanes, a single polyurethane having various soft segments may be used. Again, without intending to be limiting, the soft segments may include, in addition to soft segments having a total of eight carbon atoms or less, polyether diols, polyester diols having a total of more than eight carbon atoms, or mixtures thereof. It is contemplated that the total amount of soft segment constituency which includes the reaction product of a carboxylic acid and a diol having a total carbon atom count of more than eight, be present in an amount of up to about 30 wt. % of the total weight of soft segments included in the polyurethane. Thus, at least 70 wt. % of the soft segment repeating units will be the reaction products of carboxylic acid and a diol, wherein the total carbon atom count for the reaction product is eight or less.

It should also be noted that there are a number of ways to add polyurethanes with up to 30 wt. % of polyesters with repeat units containing more than eight carbon atoms to the polyurethanes of this invention. Thirty percent or less of a polyurethane derived from polyester diols containing repeat units with more than eight carbons can be blended as finished polymers with 70 wt. % or more of polyurethanes derived from polyester diols with repeat units containing eight or less carbon atoms, or a single polyurethane could be prepared from a mixture of polyester diols wherein 70 wt. % or more contain repeat units with eight carbons or less and the balance contains repeat units with more than eight carbons as described previously. A polyurethane could be prepared from a single diol prepared by reaction from dicarboxylic acids and diols such that 70 wt. % of the repeat units in the polyester diol contain eight or less carbon atoms. Combinations of these techniques are also possible. Among the acids that contain more than six carbon atoms that could be employed are isophthalic and phthalic acids.

The compositions containing thermoplastic urethane, hydroxyl functional copolymer, and gel reducing additive may be used in a process for preparing a sheet comprising a blend of thermoplastic polyurethane and at least one hydroxyl functional copolymer. The three components are first combined, and then thermal energy, mechanical energy, or both is applied to the combination to produce a blend. A sheet is then produced from the blend, the sheet generally having lower gel content than a sheet produced from a composition containing only the thermoplastic polyurethane and hydroxyl functional copolymer, without the gel reducing additive.

The three components may be combined in any order. In one embodiment, the three components are added in turn to a mixing chamber. In another embodiment, a composition containing the hydroxyl functional copolymer and the gel reducing additive is first prepared by combining the two components. This composition, as discussed above, exhibits a decreased gel forming tendency when blended with polymers containing urethane linkages. To form the blend, the two component composition is added to a thermoplastic polyurethane.

The gel reducing additive is generally present in the composition in minor amounts—typically up to 20% by weight, and preferably up to about 5% by weight—depending on the desired reduction of gel content and the molecular weight of the additive and level of hydroxyl functional polymer in the composition. The proportion of TPU and hydroxyl functional polymer may also vary over a wide range. Generally, the compositions may contain from 1% by weight to about 99% by weight of the hydroxyl functional barrier copolymer. Higher levels (for example 60-98%) may be used for applications requiring high gas barrier properties, such as the multilayer beverage bottle discussed below. On the other hand, relatively lower levels of hydroxyl functional polymer, with concomitantly higher levels of TPU, may be used when it is desired for the low gel blend sheet to have more durable structural properties.

To produce the blend, thermal energy, mechanical energy, or both may be applied to the combination of the three components. Generally, thermal energy is applied in order to soften or melt the components. Mechanical energy may be applied for example in the form of stirring, mixing, milling, or grinding. The mechanical energy applied to the combination serves to thoroughly mix the three components into a homogenous blend.

A sheet may be produced from the blend by a number of known processes including, without limitation, extrusion, casting, and molding. In a preferred embodiment, low gel sheets are produced from the blend by extruding the blend. Alternatively, the low gel sheets can be coextruded with other thermoplastic and gas barrier layers as discussed below.

The low gel sheets produced from a combination of thermoplastic polyurethane, hydroxyl functional barrier polymer, and gel reducing additive may be used in a variety of applications that take advantage of the improved physical properties and gas barrier characteristics of the sheet. Generally, the applications involve the use of a multi-layer composite comprising a plurality of flexible layers, wherein at least one of the flexible layers is the product of forming a sheet from a blend of thermoplastic polyurethane, hydroxyl functional copolymer, and gel reducing additive as discussed above. The plurality of flexible layers may be made of a variety of materials, including without limitation thermoplastic polyurethane, hydroxyl functional gas barrier copolymer layers, copolymers of ethylene and vinyl alcohol, polyesters, polycarbonates, and polyamides. The low gel sheets may have a variety of thicknesses, depending on the application.

In one embodiment, a hose is provided having a rubber as outer layer, and a layer made from a blend of thermoplastic polyurethane, hydroxyl functional copolymer, and a gel reducing additive as inner layer. The hose exhibits advantageous permeability characteristics to Freon 22 and other gases, and good pressure retention during prolonged use. For example, the inner layer may comprise a mixture of 1-95%, preferably 30-95% by weight of an ethylene vinyl alcohol copolymer (having 20-60 mole % ethylene units), up to 99%, preferably 5-75% by weight thermoplastic polyurethane, and 0.05-5%, preferably 0.1-1.0% by weight gel reducing additives such as glycerin. The outer layer may be made from a natural rubber or from a synthetic rubber such as EPDM. Such hoses having decreased permeability to Freon 22 and other gases are described for example in Japanese patent JP-03255288, assigned to Kuraray Co., Ltd. of Japan. They may be prepared by coextrusion of the TPU blend layer and the rubber layer.

In another embodiment, gas barrier impact resistant multi-layer containers are provided wherein one of the layers is produced from a blend containing thermoplastic polyurethane, hydroxyl functional gas barrier copolymer, and gel reducing additive. The low gel TPU blend layers are used along with one or more layers of thermoplastic polyesters, polyamides, and/or polycarbonates located on one or more sides of the TPU blend layer to provide bottles having useful flavor retaining properties for packaging beverages, foods, or cosmetics. In a non-limiting example, a 60-98:2-40 blend of 20-60:40-80 (mole %) ethylene vinyl alcohol copolymer and thermoplastic polyurethanes is treated with 1-20% by weight of a gel reducing additive such as glycerin. The TPU/EVOH/glycerin are blended and blow-molded with isophthalic modified PET (as inner and outer layers) to give a bottle having layer thickness of 190:20:90 microns from inside to outside. The reduced gel of the TPU/EVOH layer leads to improved clarity, while the TPU/EVOH blend contributes advantageous gas permeability characteristics. Such bottles may be made according to procedures described in Japanese patent JP-03175032 assigned to Kuraray Co., Ltd. of Japan, the disclosure of which is incorporated by reference.

Figure 2:
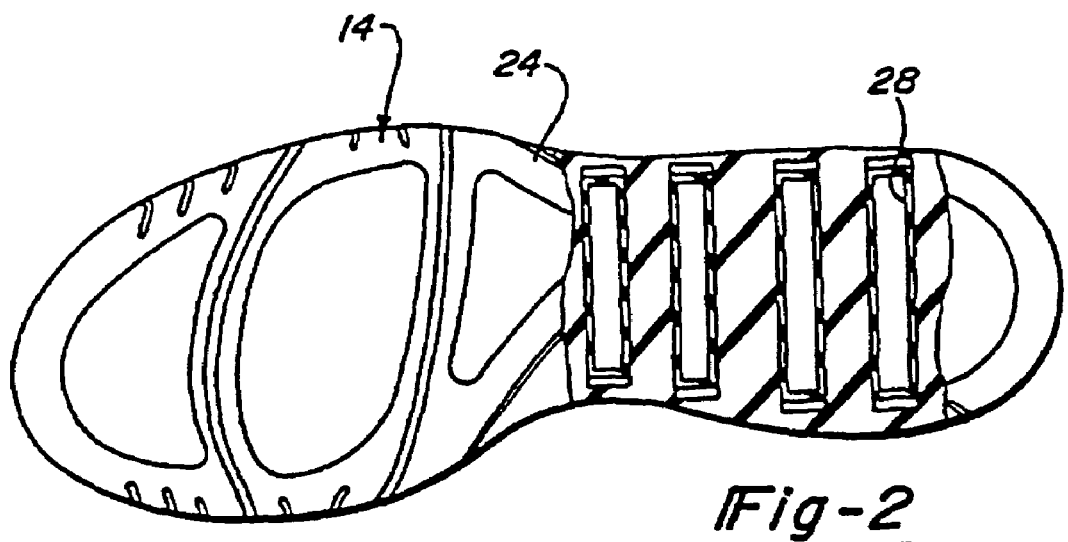
FIG. 2 is a bottom elevational view of the athletic shoe of FIG. 1 with a portion cut-a-way to expose another cross-sectional view.
Figure 3:
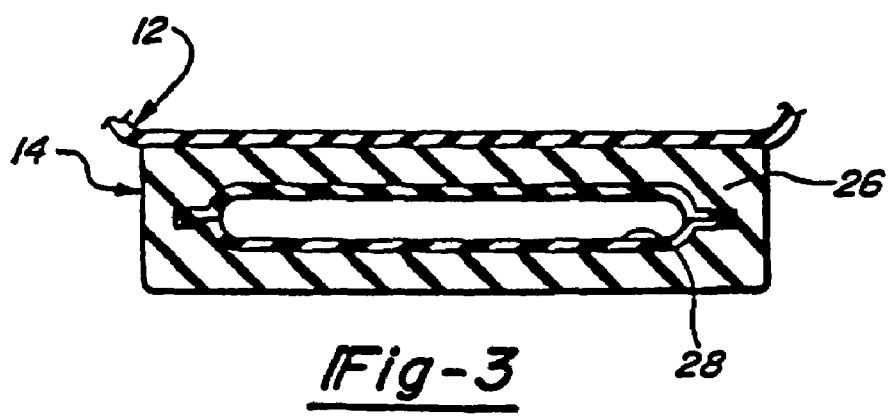
FIG. 3 is a section view taken alone line 3-3 of FIG. 1.

In a preferred embodiment, the low gel sheets containing TPU and a hydroxyl functional gas barrier layer copolymer are used as part of a polymer composite membrane that can be formed into inflatable bladders and the like for applications such as athletic footwear. For example, referring to FIGS. 1-5, a barrier membrane 28 in accordance with teachings of the present invention is provided in the form of a cushioning device. As shown, the membrane 28 has a composite structure including an inner layer 30 formed from a blend of TPU, hydroxyl functional copolymer, and gel reducing additive of the invention. The inner layer allows for controlled diffusion pumping or self-pressurization. The outer layer 32 is formed of a flexible resilient elastomeric material which preferably is resistant to expansion beyond a predetermined maximum volume for the membrane when subjected to gaseous pressure.

The outer layer 32 preferably is formed of a material or combination of materials which offer superior heat sealing properties, flexural fatigue strength, a suitable modulus of elasticity, tensile and tear strength and abrasion resistance. Among the available materials which offer these characteristics, it has been found that thermoplastic elastomers of the urethane variety, otherwise referred to herein as thermoplastic urethanes or simply TPU, are highly preferred because of their excellent processability.

Non-limiting examples of thermoplastic urethanes useful in forming the outer layer 32 are PELLETHANE™ 2355-85ATP and 2355-95AE (Dow Chemical Company of Midland, Mich.), ELASTOLLAN® (BASF Corporation) and ESTANE® (B.F. Goodrich Co.), all of which are either ester or ether based. Still other thermoplastic urethanes based on polyesters, polyethers, polycaprolactone, and polycarbonate macroglycols can be employed. In one embodiment, the thermoplastic urethane(s) employed to form the outer layer 32 are aromatic in nature.

Referring still to FIGS. 1-5, there is shown an athletic shoe, including a sole structure and a cushioning device as one example of a product employing a barrier membrane in accordance with the teachings of the present invention. The shoe 10 includes a shoe upper 12 to which the sole 14 is attached. The shoe upper 12 can be formed from a variety of conventional materials including, but not limited to, leathers, vinyls, nylons and other generally woven fibrous materials. Typically, the shoe upper 12 includes reinforcements located around the toe 16, the lacing eyelets 18, the top of the shoe 20 and along the heel area 22. As with most athletic shoes, the sole 14 extends generally the entire length of the shoe 10 from the toe region 20 through the arch region 24 and back to the heel portion 22.

The sole structure 14 includes one or more selectively permeable barrier membranes 28 in accordance with the present invention, which are preferably disposed in the mid-sole H of the sole structure. By way of example, the barrier membranes 28 of the present invention can be formed having various geometries such as the plurality of tubular members which are positioned in a spaced apart, parallel relationship to each other within the heel region 22 of the mid sole 26 as illustrated in FIGS. 1-5. The tubular members are sealed to contain an injected captive gas. More specifically, each of the barrier membranes 28 are formed to include a barrier layer which permits diffusion of mobile gases but which resists or prevents diffusion of the captive gases. These predetermined diffusion properties of the membrane 28 are provided by an inner barrier layer 30 which is disposed along the inner surface of a thermoplastic outer layer 32. These two membrane layers may be best seen in FIGS. 4 and 5. As previously noted, the barrier membranes 28 of the present invention can be formed in a variety of configurations or shapes. Barrier membrane configurations under the present invention (whether in the form of a tube, an elongated pad or other such configuration), may either be fully or partially encapsulated within the mid-sole or out-sole of an article of footwear. The inner layer 30 is formed from a blend of TPU, hydroxyl functional copolymer, and gel reducing additive as described above.

Referring now to FIGS. 6 and 7, an alternative barrier membrane embodiment 28A in the form of an elongated tubular shaped multi-layered component is illustrated. The modified barrier membrane 28A is essentially the same as the composite structure illustrated in FIGS. 1-5 except that a third layer 34 is provided contiguously along the inner surface of the barrier layer 30, such that the barrier layer 30 is sandwiched between the outer layer 32 and innermost layer 34. The innermost layer 34 is also preferably made from a thermoplastic urethane material to add further protection for the barrier layer 30. In addition to the benefits of enhanced protection against degradation of the barrier layer 30, layer 34 also tends to assist in providing for high quality welds which allow for the three-dimensional shapes of the cushioning devices.

The cushioning devices shown in FIGS. 1-7 may be fabricated from multi-layered extruded tubes. Lengths of the coextruded tubing ranging from one foot to coils of up to 5 feet may be inflated to a desired initial inflation pressure ranging from 0 psi ambient to 100 psi, preferably in the range of 5 to 50 psi, with the captive gas preferably being nitrogen. Sections of the tubing are RF welded or heat sealed to the desired lengths. The individual cushioning devices produced are then separated by cutting through the welded areas between adjacent cushioning devices. Alternatively, the extruded tubes may be welded or heat sealed before inflation. It should also be noted that the cushioning devices can be fabricated with so-called lay flat extruded tubing as is known in the art whereby the internal geometry is welded into the tube.

As the blended first layer including the one or more polyester polyol based urethanes and one or more copolymers of ethylene and vinyl alcohol and the second layer including thermoplastic urethane advance to the exit end of the extruder through individual flow channels, once they near the die-lip exit, the melt streams are combined and arranged to flow together in layers typically moving in laminar flow as they enter the die body. In one embodiment, the materials are combined at a temperature of between about 300° F. to about 450° F. and a pressure of at least about 200 psi to obtain optimal wetting for maximum adhesion between the contiguous portions of the layers 30, 32 and 34 respectively. Again, for multi-layered laminates, it is preferred that the polyester polyols and isocyanate moieties utilized in forming the barrier layer be aliphatic in nature, since aliphatic urethanes have been found to be readily processable utilizing conventional sheet extrusion techniques.

The blended barrier layer 30 will generally include about 1 to 97 weight % of polyester polyol based TPU. In some embodiments, TPU will be present up to 50 weight %, preferably 1-30 weight % or 5-25 weight %.

For certain embodiments, it may also be useful to include a relatively small amount of at least one aromatic or aliphatic thermoplastic polyurethane in the blended barrier layer 30 as a viscosity modifier. Under those embodiments employing at least one aromatic thermoplastic urethane, the total amount will generally be 3 wt. % or less based on a 100 wt. % constituency of the barrier layer. Thus, the composition of the blended barrier layer can be summarized as including: (1) up to about 95 wt. %, preferably 2% to 95% wt. %, of at least one hydroxyl functional barrier polymer such as a copolymer of ethylene and vinyl alcohol; (2) 1 wt. % to about 99 wt. % of an aliphatic or aromatic or the combination of two thermoplastic urethanes; and (3) about 0.05 to about 5 weight % gel reducing additive, wherein the total constituency of the barrier layer is equal to 100 wt. %. The aromatic thermoplastic urethanes are also selected from the group consisting of polyester, polyether, polycaprolactone, polyoxypropylene and polycarbonate macroglycol based materials and mixtures thereof.

As previously noted, the barrier membranes as disclosed herein can be formed by various processing techniques including but not limited to extrusion, blow molding, injection molding, vacuum molding and heat sealing or RF welding of tubing and sheet extruded film materials. Preferably, the membranes of the present invention are made from films formed by co-extruding the outer layer of thermoplastic urethane material and the inner layer of the blended polyester polyol based thermoplastic urethane and copolymer of ethylene and vinyl alcohol together to effectively produce multi-layered film materials with the resulting barrier membranes produced from this material. Subsequently, after forming the multi-layered film materials, the film materials are heat sealed or welded by RF welding to form the inflatable barrier membranes which have the characteristics of both high flexibility and diffusion pumping capabilities.

In the above embodiments, the low gel sheet containing a blend of TPU and hydroxyl functional barrier copolymer is used in composites to provide gas barrier properties. In other embodiments, the low gel sheet is used along with other layers of barrier copolymer sheets and elastomeric sheets. Multilayer composites such as these may take on a variety of configurations. Non-limiting examples are schematically illustrated in FIGS. 8a, 8b, and 8c. In FIG. 8a, a multilayer composite 80 is illustrated having two layers of a low gel TPU blend sheet 81 between which are sandwiched 3 layers including two layers of an elastomeric sheet 83 and one of a hydroxyl functional copolymer barrier sheet 85. A similar sandwich device is illustrated in FIG. 8b, except that the multilayer composite contains 2 sheets of a gas barrier copolymer sheet 85 and three sheets of an elastomeric layer 83. Similarly, in FIG. 8c, a multilayer composite is shown containing three gas barrier polymer sheets 85 and 4 elastomeric sheets 83. In a preferred embodiment, the gas barrier sheets comprise 1 or more hydroxyl functional copolymers as described above. Also preferably, the elastomeric material is advantageously a thermoplastic polyurethane sheet.

In FIGS. 8a, 8b and 8c, the overall thickness of the one, two, or three layers of hydroxyl functional copolymer sheet is selected so as to obtain the desired gas permeability. Typically the total thickness of the gas barrier sheets in multilayer composites such as illustrated in FIG. 8a, 8b and 8c is on the order of 1 mil (about 25 micrometers), that is from about 0.1 mil to about 10 mil.

The multilayer composites illustrated in the FIGS. 8 may also contain other structural layers, not shown, typically provided on the outside of low gel layers 81 and 82. Typical structural outside layers include elastomeric materials, such as thermoplastic polyurethane, natural rubber, and synthetic rubbers. It is also understood that one or more of the sandwiched gas barrier copolymer sheets may be made of a low gel blend of TPU and hydroxyl functional copolymer. The relative thicknesses of the layers and the length of the sheets illustrated in FIGS. 8a, 8b and 8c are given for clarity, and do not necessarily represent actual preferred values.

The low gel TPU blend sheets may also be used to produce microlayer polymeric composites. The microlayer composites contain significantly more than the three, five, or seven layers the sandwich structures illustrated in FIG. 8. In a preferred embodiment, the microlayer polymeric composite of the invention has alternating thin layers of fluid barrier material and a structural, elastomeric material sandwiched between low gel TPU blend layers. In one embodiment, the microlayer polymeric composite has at least about 10 layers. Preferably, the microlayer polymeric composite has at least about 20 layers, more preferably at least about 30 layers, and still more preferably at least about 50 layers. The microlayer polymeric composite can have thousands of layers, and the skilled artisan will appreciate that the number of layers will depend upon such factors as the particular materials chosen, thicknesses of each layer, the thickness of the microlayer polymeric composite, the processing conditions for preparing the multilayers, and the final application of the composite. The microlayer elastomer membranes preferably has from about 10 to about 1000 layers, more preferably from about 30 to about 1000 and even more preferably it has from about 50 to about 500 layers.

Also contemplated are microlayer polymeric composites that include layers of different fluid barrier materials and/or layers of different elastomeric materials, all of the different layers being arranged in regular repeating order. Other layers in addition to elastomeric layers and fluid barrier layers that alternate along with them in a regular, repeating order may optionally be included.

The average thickness of each individual layer of the fluid barrier material in the microlayer composition may be as low as a few nanometers to as high as several mils (about 100 microns) thick. Preferably, the individual layers have an average thickness of up to about 0.1 mil (about 2.5 microns). Average thicknesses of about 0.0004 mil (about 0.01 micron) to about 0.1 mil (about 2.5 microns) are particularly preferable. For example, the individual barrier material layers can be, on average, about 0.05 mils (about 1.2 microns). The thinner layers of the fluid barrier layer material improves the ductility of the bladder membrane.

The multilayer polymeric composites may be formed by a variety of methods. In a preferred method, a microlayer core composed of alternating TPU and barrier layers is first made and then structural layers containing mostly TPU with a minor amount of EVOH are added on both sides of the core. During formation of the microlayer core, TPU serves as both tie layer and protective layer.

In one process, the multilayer polymeric composites of the invention can be prepared using a two-layer, three-layer, or five-layer feed block that directs the layered stream into a static mixer or layer multiplier. The static mixer has multiple mixing elements, preferably at least about 5 elements, that increases the number of layers geometrically.

In another method, the multilayer polymeric composites of the invention can be prepared by providing a first stream comprising discrete layers of polymeric material. A preferred embodiment of this method is described in detail in Schrenk, et al., U.S. Pat. No. 5,094,793, issued Mar. 10, 1992, which is incorporated herein in its entirety by reference. Briefly, the first stream comprising discrete layers can again be formed by directing the molten extrudate from extruders separately containing the elastomeric material and the fluid barrier material into a two-layer, three-layer, or five-layer feed block. The first stream is then divided into a plurality of branch streams, the branch streams are then redirected or repositioned and individually symmetrically expanded and contracted, being finally recombined in an overlapping relationship to form a second stream with a greater number of discrete layers. In addition, protective boundary layers may be incorporated according to the method of Ramanathan et al., U.S. Pat. No. 5,269,995, issued Dec. 14, 1993, which is incorporated herein in its entirety by reference. The protective layers are provided by a steam of molten thermoplastic material which is supplied to the exterior surfaces of the composite stream to form a protective boundary layer at the wall of the coextrusion apparatus. The protective layer may add special optical or physical attributes to the microlayer polymeric composite material, such as special coloration, including metallic coloration obtained by including metallic or other flake pigments in the protective boundary layer. The protective layers protect the structural and fluid barrier layers from instability and breakup during the layer formation and multiplication.

Although it is not necessary for all of the layers to be complete layers, that is to extend in the plane of that layer to all edges of the piece, it is desirable for most layers to be substantially complete layers, that is to extend to the edges of the membrane.

The elastomeric membrane of the invention includes the microlayer polymeric composite, either as an only layer or as one layer in a laminate construction. The membrane may be of any convenient length and width for forming the desired footwear bladder or hydraulic accumulator. The average thickness of the microlayer polymeric composite of the membrane may vary widely, but it may be, for example, from about 3 mils (about 75 microns) to about 200 mils (about 0.5 cm). Preferably, the average thickness of the microlayer polymeric composite is at least about 50 microns, preferably from about 75 microns to about 0.5 cm, more preferably from about 125 microns to about 0.5 cm, and particularly preferably from about 125 microns to about 0.15 cm. When the microlayer polymeric composite is to be used to prepare a bladder for footwear it is preferred that the microlayer material have an average thickness of from about 3 mils (about 75 microns) to about 40 mils (about 0.1 cm), while membranes used in hydropneumatic accumulators are usually thicker. In one preferred embodiment the microlayer polymeric composite has an average thickness of at least about 125 microns.

The membrane of the invention can be a laminate that includes the microlayer polymeric material as one or more laminate layers. Preferably, the alternate layers are selected from the polymers listed above as suitable as the structural material of the microlayer material, and more preferably the alternate layers are polyurethane materials. Any number of microlayer layers, preferably from one to about 5, more preferably one to three are used as alternate layers of the laminate. The other layers of the laminate preferably as elastomeric and include thermoplastic elastomers selected from those already mentioned as suitable for the structural layers of the microlayer polymeric composite. One preferred membrane of the invention is a laminate that includes at least one layer A of an elastomeric polyurethane and at least one layer B of the microlayer polymeric composite. In other preferred embodiment, the membrane is a laminate having layers A-B-A or layers A-B-A-B-A.

When the microlayer polymeric film is used to prepare a laminate, the laminate may have an average thickness of from about 3 mils (about 75 microns) to about 200 mils (about 0.5 cm), and preferably it has an average thickness of from about 3 mils (about 75 microns) to about 50 mils (about 0.13 cm). The microlayer polymeric film layer of the laminate is preferably from about 0.25 mil (about 6.35 microns) to about 102 mils (2600 microns).

A bladder may be produced by RF (radio frequency) welding two sheets of the microlayer material or microlayer-containing laminate, particularly when one layer is a polar material such as a polyurethane. Non-polar materials such as polyolefins can be welded using ultrasound or heat sealing techniques. Other well-known welding techniques may also be employed.

When used as cushioning devices in footwear such as shoes, the bladder may be inflated, preferably with nitrogen, to an internal pressure of at least about 3 psi and up to about 50 psi. Preferably the bladder is inflated to an internal pressure of from about 5 psi to about 35 psi, more preferably from about 5 psi to about 30 psi, still more preferably from about 10 psi to about 30 psi, and yet more preferably from about 15 psi to about 25 psi. It will be appreciated by the skilled artisan that in applications other than footwear applications the desired and preferred pressure ranges may vary dramatically and can be determined by those skilled in that particular field of application. Accumulator pressures, for example, can range up to perhaps 1000 psi.

Preferably, the membranes described herein may be useful for forming cushioning components for footwear. In such applications, the membranes preferably are capable of containing a captive gas for a relatively long period of time. In a highly preferred embodiment, for example, the membrane should not lose more than about 20% of the initial inflated gas pressure over a period of approximately two years. In other words, products inflated initially to a steady state pressure of between 20.0 to 22.0 psi should retain pressure in the range of about 16.0 to 18.0 psi for at least about two years.

The inflationary gas transmission rate of the material for the inflationary gas, which is preferably nitrogen gas, should be less than 10 cubic centimeters per square meter per atmosphere per day (cc/m$^2$ atm day), preferably less than about 3 cc/m$^2$ atm.day, and particularly preferably less than about 2 cc/m$^2$ atm day.

The microlayer polymeric composites provide increased resistance to delamination and cracking. Dividing the barrier layer into numerous layers increases the resistance of individual layers to cracking. While not wishing to be bound by theory, it is believed that, given the same external dimensions and a constant density of flaws, a laminate with thinner layers will likely contain fewer flaws in each layer. Thus, the microlayer polymeric composites containing the same amount of barrier material overall as a traditional laminate, but having the barrier material divided between many more layers than the one layer or few layers in the traditional laminate, will contain more barrier material in uncracked layers than would the traditional laminate if a crack should develop from each flaw as the material is loaded. In addition, if a barrier layer in a microlayer composite develops a crack, dissipative processes along the interfaces help to confine the crack to one layer. Fluid transmission rate should not be affected significantly if cracks develop within some of the barrier layers because adjacent barrier layers still force the diffusing species to take a circuitous path in order to permeate the membrane.

EXAMPLES

In the Examples that follow:

TPU-1 is a butanediol adipate MDI based TPU with a melt index of about 12 and a shore A hardness of 80A.

TPU-2 is Kuramiron® U #3190 from Kuraray with a shore A hardness of 90A.

TPU-3 is a butanediol adipate MDI based TPU with a melt index of 10 and a shore A hardness of 80A.

EVOH-1 is a copolymer of ethylene and vinyl alcohol containing 44 mol % ethylene.

Gel content of a sample is measured according to the following procedure. Into a vial around 0.3 g of the sample and 10 ml THF are charged. The sample forms a cloudy solution, which is transferred to an ultracentrifuge tube. An additional 5 ml fresh THF is used to wash the vial and the solution/solvent is added into the centrifuge tube. The washing is repeated for one more time. The ultra-centrifuging condition was set at 18-20 krpm, 60 min, 10° C. After centrifugation, it is observed that the gel is deposited at the bottom of the tube. The clear solution is transferred out and the THF is removed by evaporation. Both gel and recovered TPU are dried to a constant mass; gel content is calculated as weight of gel divided by total weight of gel plus TPU, multiplied by 100.

Mn is the number average molecular weight and PDI is the polydispersity index, both of which are measured in the conventional way by gel permeation chromatography.

Example 1

Dry TPU-1 (58.91 g), EVOH-1 (3.10 g) and various amount of glycerin (GLY) was mixed in a Brabender mixing head at 195° C. at a speed of 40 RPM for 40 minutes. The percent gel was determined.

|  | Comparative Example 1 | Example 1a | Example 1b |
|---|---|---|---|
| Sample | TPU-1 + 5% EVOH-1 | TPU-1 + 5% EVOH-1 + 0.5 wt % GLY | TPU-1 + 5% EVOH-1 + 1 wt % GLY |
| % Gel | 34 | 16 | 9 |

The gel content decreases with increasing glycerin concentration.

Example 2

A 90 wt % EVOH-1 10 wt % glycerin sample was produced by extrusion using a Prism TSE 16 mm extruder. Liquid injection of glycerin was utilized. 5% sample and 95% TPU-2 was mixed in a Brabender mixing head at 194° C. at a speed of 40 RPM for 40 minutes. A blend of 5% EVOH-1 and 95% TPU-2 was produced under the same conditions for comparison. The percent gel was determined.

|  | Comparative Example 2 | Example 2 |
|---|---|---|
| Sample | 5% EVOH-1 + 95% TPU-2 | 5% (90% EVOH-1/10% GLY) + 95% TPU-2 |
| % Gel | 50 | 36 |

Gel content was reduced to 36% with the addition of glycerin.

Example 3

Mixtures of 5/95 EVOH-1/TPU-3 and various amount of alcohols were extruded using a Brabender twin screen extruder. The temperature settings were 190, 210 and 210° C. for zone 1, zone 2 and die, respectively. The screw speed was 40 rpm. After extrusion, the blends were dried and re-extruded to about 2.5-3.5 inch wide, 30-40 mil thick tapes on a Brabender single screw extruder at temperatures of 190, 200, 200 and 200° C. for zone 1, zone 2, zone 3 and die, respectively. The screw speed was 40 rpm. The gel content of the tape was measured.

|  | Alcohol | % Gel | Mn | PDI |
|---|---|---|---|---|
| Comparative Example 3 | None | 31 | 39,000 | 2.43 |
| Example 3a | 0.1% glycerin | 27 | 36,000 | 2.59 |
| Example 3b | 0.25% glycerin | 27 | 40,000 | 2.10 |
| Example 3c | 0.5% glycerin | 21 | 40,000 | 1.71 |
| Example 3d | 0.14% trimethylolpropane (TMP) | 24 | 39,000 | 2.30 |
| Example 3e | 0.34% TMP | 22 | 40,000 | 2.15 |
| Example 3f | 0.68% TMP | 21 | 35,000 | 2.21 |
| Example 3g | 0.16% neopentyl glycol (NPG) | 27 | 38,000 | 2.61 |
| Example 3h | 0.41% NPG | 27 | 37,000 | 2.26 |
| Example 3i | 0.82 NPG | 21 | 35,000 | 1.79 |

The gel content was reduced with the addition of alcohol. The molecular weight of the soluble portion of TPU was not largely affected by the presence of alcohol in most cases.

Example 4

Same as Example 3 except that the low molecular weight alcohols were replaced with 1000 molecular weight ethylene glycol adipate (EGA) or butanediol adipate (BDA) diols from Witco.

|  | Diol | % Gel | Mn | PDI |
|---|---|---|---|---|
| Example 4a | 1% EGA | 28 | 39,000 | 2.65 |
| Example 4b | 2% EGA | 18 | 43,000 | 2.44 |
| Example 4c | 4% EGA | 13 | 53,000 | 1.63 |
| Example 4d | 1% BDA | 25 | 39,000 | 2.23 |
| Example 4e | 2% BDA | 17 | 44,000 | 2.48 |
| Example 4f | 4% BDA | 12 | 47,000 | 1.59 |

We claim:

1. A shoe, comprising an upper and a sole, wherein the sole comprises one or more inflatable membranes for containing an inflationary gas, wherein at least one of the membranes comprises a multilayer composite, wherein the composite comprises at least one flexible layer comprising a low gel sheet formed from a composition comprising a blend of thermoplastic polyurethane, hydroxyl functional copolymer, and a gel reducing additive, wherein the composition comprises 0.05% to 20% by weight of the gel reducing additive, wherein the hydroxyl-functional copolymer comprises a) a polymer having 10 mole percent or more of repeating units of structure

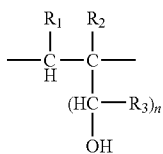

wherein n is 1, R1 and R2 are independently hydrogen, methyl, or ethyl, and R3 is hydrogen or $C_{1-3}$ alkyl, or b) a copolymer of ethylene and vinyl alcohol with 25-60 mol % ethylene, and wherein the gel reducing additive is selected from the group consisting of compounds with two or more hydroxyl groups, compounds with at least one primary amino group, compounds with at least one secondary amino group, compounds with at least one carboxyl group, and compounds with at least one carboxylic anhydride group.

2. A shoe according to claim 1, wherein the composite further comprises at least one layer of ethylene vinyl alcohol copolymer and at least one layer of thermoplastic polyurethane.

3. A shoe according to claim 1, wherein the composition comprises 0.5% to 20% by weight of the gel reducing additive.

4. A shoe according to claim 1, wherein the composition comprises 1% to 20% by weight of the gel reducing additive.

5. A shoe according to claim 1, wherein the hydroxyl functional copolymer comprises a copolymer of ethylene and vinyl alcohol.

6. A shoe according to claim 5, wherein the molecular weight of the gel reducing additive is less than or equal to 2000.

7. A shoe according to claim 5, wherein the molecular weight of the gel reducing additive is less than or equal to 200.

8. A shoe according to claim 5, wherein the gel reducing additive comprises a compound having two or more hydroxyl groups.

9. A shoe according to claim 5, wherein the gel reducing additive comprises a compound with two or more amino groups.

10. A shoe according to claim 5, wherein the gel reducing additive is selected from the group consisting of ethylene glycol, diethylene glycol, glycerol, trimethylolpropane, ditrimethylolpropane, pentaerythritol, ethylenediamine, diethylenetriamine, triethylenetetramine, polyethylene glycol of molecular weight less than or equal to 400, propylene glycol, and dipropylene glycol.

11. A shoe according to claim 1, wherein the composite comprises outer layers made of a blend of thermoplastic polyurethane, ethyl vinyl alcohol copolymer, and gel reducing additive, and the inner layers comprise alternating layers of ethylene vinyl alcohol copolymer and thermoplastic polyurethane.

12. A shoe according to claim 11, wherein the composite comprises 10 or more inner layers.

13. A shoe according to claim 11, wherein the composite comprises 30 or more inner layers.

14. A shoe according to claim 1, wherein the composition comprises 0.05% to 5% by weight of the gel reducing additive.

15. A shoe according to claim 14, wherein the hydroxyl functional copolymer comprises a copolymer of ethylene and vinyl alcohol.

16. A shoe according to claim 15, wherein the composite comprises 10 or more inner layers.

17. A shoe according to claim 15, wherein the composite comprises 30 or more inner layers.

18. A shoe according to claim 15, wherein the gel reducing additive comprises a compound having two or more hydroxyl groups.

19. A shoe according to claim 15, wherein the gel reducing additive comprises a compound with two or more amino groups.

20. A shoe according to claim 15, wherein the gel reducing additive is selected from the group consisting of ethylene glycol, diethylene glycol, glycerol, trimethylolpropane, ditrimethylolpropane, pentaerythritol, ethylenediamine, diethylenetriamine, triethylenetetramine, polyethylene glycol of molecular weight less than or equal to 400, propylene glycol, and dipropylene glycol.

21. A shoe according to claim 14, wherein the composite further comprises at least one layer of ethylene vinyl alcohol copolymer and at least one layer of thermoplastic polyurethane.

22. A shoe according to claim 14, wherein the composite comprises outer layers made of a blend of thermoplastic polyurethane, ethyl vinyl alcohol copolymer, and gel reducing additive, and the inner layers comprise alternating layers of ethylene vinyl alcohol copolymer and thermoplastic polyurethane.

* * * * *